US012627858B2

(12) United States Patent
Anupuru et al.

(10) Patent No.: US 12,627,858 B2
(45) Date of Patent: May 12, 2026

(54) PERSON OCCUPANCY DETECTION IN HOTELS USING UWB TECHNOLOGY AND INTEGRATION WITH MATTER PROTOCOL IN STB

(71) Applicant: DISH Network Technologies India Private Limited, Englewood, CO (US)

(72) Inventors: Sreevastav Anupuru, Kurnool (IN); Srinivasarao Duddu, Bengalore (IN); Dileep Puramana, Wandoor (IN); Ananda Siddappa, KR Puram (IN)

(73) Assignee: DISH Network Technologies India Pvt Ltd., Bangalore (IN)

( * ) Notice: Subject to any disclaimer, the term of this patent is extended or adjusted under 35 U.S.C. 154(b) by 0 days.

(21) Appl. No.: 18/626,211

(22) Filed: Apr. 3, 2024

(65) Prior Publication Data

US 2025/0317619 A1     Oct. 9, 2025

(51) Int. Cl.
*H04N 21/442*       (2011.01)
*H04N 21/45*       (2011.01)

(52) U.S. Cl.
CPC ... *H04N 21/44218* (2013.01); *H04N 21/4532* (2013.01)

(58) Field of Classification Search
None
See application file for complete search history.

(56) References Cited

U.S. PATENT DOCUMENTS 6,054,950 A     4/2000   Fontana
6,571,221 B1    5/2003   Stewart et al.

7,231,516 B1    6/2007   Sparrell et al.
7,372,821 B2    5/2008   Sato et al.
8,108,493 B2    1/2012   Lakamp
8,495,729 B2    7/2013   Park
8,621,530 B1    12/2013  Guzman et al.
(Continued)

OTHER PUBLICATIONS

"Ultra-Wideband RTLS, Positioning, & Sensor Technology", Inpixon. com, web page downloaded from the Internet at https://www.inpixon. com/technology/standards/ultra-wideband, on Jun. 9, 2024.
(Continued)

*Primary Examiner* — Alexander Q Huerta
(74) *Attorney, Agent, or Firm* — Wash Park IP Ltd.; John T. Kennedy

(57)       ABSTRACT

Devices, systems and methods are described for detecting occupancy of persons within hotels using ultra-wide band tag and a MATTER protocol. A system may include a set top box (STB) coupled to a hotel management server (HMS) a user device (UD), an ultra-wideband tag (UWT) and an electronic device coupled to the STB located within a hotel room. The STB executes computer instructions which instantiate an STB user location engine (SULE), an STB user preference engine (SUPE) and an STB Room Configure Engine (SRCE). The STB performs STB User Location Operations (SULOs) include scanning at least one ultra-wideband (UWB) frequency for a signal from the UWT, determining whether the UWT, when detected, is within an STB determined distance, receiving an association of at least one user preference with the UWT, and configuring the electronic device in view of the at least one user preference.

16 Claims, 7 Drawing Sheets

(56) References Cited

U.S. PATENT DOCUMENTS

| | | |
|---|---|---|
| 8,856,843 B1 | 10/2014 | Hubach et al. |
| 8,903,980 B2 | 12/2014 | Hyvarinen et al. |
| 9,215,139 B2 | 12/2015 | Hyvarinen et al. |
| 9,326,139 B2 | 4/2016 | Johan |
| 9,330,250 B2 | 5/2016 | Medvinsky et al. |
| 9,532,097 B1 | 12/2016 | Chen et al. |
| 10,291,956 B2 | 5/2019 | Zdepski et al. |
| 10,327,035 B2 | 6/2019 | Zerr et al. |
| 10,631,042 B2 | 4/2020 | Zerr et al. |
| 10,743,075 B2 | 8/2020 | Zerr et al. |
| 10,996,702 B2 | 5/2021 | Imes et al. |
| 11,330,326 B2 | 5/2022 | Zerr et al. |
| 11,671,651 B2 | 6/2023 | Zerr et al. |
| 11,770,197 B2 | 9/2023 | Zhang et al. |
| 2003/0061315 A1 | 3/2003 | Jin |
| 2005/0283791 A1 | 12/2005 | Mccarthy et al. |
| 2006/0170778 A1 | 8/2006 | Ely et al. |
| 2006/0281477 A1 | 12/2006 | Downes |
| 2007/0088814 A1 | 4/2007 | Torii |
| 2008/0004075 A1 | 1/2008 | Horton et al. |
| 2008/0095374 A1 | 4/2008 | Schreyer |
| 2010/0128709 A1 | 5/2010 | Liu et al. |
| 2010/0180312 A1 | 7/2010 | Toya |
| 2011/0116419 A1 | 5/2011 | Cholas et al. |
| 2011/0314192 A1 | 12/2011 | Ahn et al. |
| 2012/0151510 A1 | 6/2012 | Ramaswamy et al. |
| 2012/0210011 A1 | 8/2012 | Liu et al. |
| 2012/0259967 A1 | 10/2012 | Hyvarinen et al. |
| 2013/0111522 A1 | 5/2013 | Tatem et al. |
| 2013/0258197 A1 | 10/2013 | Schmehl et al. |
| 2013/0346564 A1 | 12/2013 | Warrick et al. |
| 2014/0033236 A1 | 1/2014 | Guzman et al. |
| 2014/0152834 A1 | 6/2014 | Kosseifi et al. |
| 2014/0337927 A1 | 11/2014 | Medvinsky et al. |
| 2015/0051994 A1 | 2/2015 | Ward et al. |
| 2015/0304724 A1 | 10/2015 | Prosserman et al. |
| 2015/0324332 A1 | 11/2015 | Perret et al. |
| 2016/0080821 A1 | 3/2016 | Makhijani et al. |
| 2016/0099928 A1 | 4/2016 | Chatwin et al. |
| 2016/0227408 A1 | 8/2016 | Sherin |
| 2017/0034560 A1* | 2/2017 | Garner ............. H04N 21/43637 |
| 2017/0094345 A1 | 3/2017 | Zerr et al. |
| 2018/0095121 A1 | 4/2018 | Gilson et al. |
| 2018/0316389 A1* | 11/2018 | Belk ............... H04N 21/44218 |
| 2018/0343397 A1 | 11/2018 | Chandrashekar et al. |
| 2019/0082233 A1 | 3/2019 | Love et al. |
| 2019/0109975 A1 | 4/2019 | Linderoth et al. |
| 2019/0364120 A1* | 11/2019 | Bandela ............. H04N 21/4223 |
| 2021/0124317 A1* | 4/2021 | Pouw ................. G05B 19/0426 |
| 2021/0203498 A1 | 7/2021 | Shin et al. |
| 2022/0004254 A1 | 1/2022 | Roberts et al. |
| 2022/0021684 A1 | 1/2022 | Mensah et al. |
| 2022/0137204 A1 | 5/2022 | Nguyen et al. |
| 2022/0148217 A1 | 5/2022 | Hallett et al. |
| 2022/0284624 A1 | 9/2022 | Nimmagadda et al. |
| 2022/0303592 A1 | 9/2022 | Tamjid et al. |
| 2022/0368956 A1 | 11/2022 | Resnick et al. |
| 2023/0116882 A1 | 4/2023 | Bates et al. |
| 2023/0222674 A1 | 7/2023 | Balarajashetty et al. |
| 2023/0269420 A1 | 8/2023 | Zerr et al. |
| 2023/0394951 A1 | 12/2023 | Jeong et al. |
| 2024/0121129 A1 | 4/2024 | Ergen et al. |
| 2024/0305496 A1 | 9/2024 | Ergen et al. |
| 2024/0346274 A1 | 10/2024 | DiTullio et al. |
| 2025/0039860 A1 | 1/2025 | Reddy et al. |
| 2025/0088822 A1* | 3/2025 | McClellan .............. H04W 4/33 |
| 2025/0216533 A1* | 7/2025 | Majdali ................. G01S 13/878 |

OTHER PUBLICATIONS

U.S. Appl. No. 18/885,679, filed Sep. 15, 2024 (Available at USPTO Patent Center).

U.S. Appl. No. 17/575,497, Prosecution History through Sep. 15, 2024.

U.S. Appl. No. 17/960,185, Prosecution History through Sep. 15, 2024.

U.S. Appl. No. 18/407,659, Prosecution History through Sep. 15, 2024.

Wikipedia, "Indoor Positioning System", downloaded from the Internet on Oct. 19, 2021 at https://en.wikipedia.org/wiki/Indoor_positioning_system.

Wikipedia, definition of "AirTag", downloaded from the Internet onOct. 19, 2021 from https://en.wikipedia.org/wiki/airtag.

U.S. Appl. No. 17/960,185, Non-final Office Action, dated Dec. 12, 2024.

U.S. Appl. No. 17/960,185, Response to Non-final Office Action with electronic Terminal Disclaimer, dated Dec. 12, 2024.

U.S. Appl. No. 17/960,185, Prosecution History through May 21, 2024.

U.S. Appl. No. 18/407,659, Prosecution History through May 21, 2024.

U.S. Appl. No. 17/960,185, filed Oct. 5, 2022.

U.S. Appl. No. 18/669,902, filed May 21, 2024.

U.S. Appl. No. 18/407,659, filed Jan. 9, 2024.

U.S. Appl. No. 17/960,185, filed Oct. 5, 2022, Christopher William Krasny Ergen.

U.S. Appl. No. 17/960,185, Prosecution History to date.

U.S. Appl. No. 18/407,659, filed Jan. 9, 2024, Dish.

Fan, J. I., and K. Khoshelham. "Augmented Reality Asset Tracking Using Hololens." ISPRS Annals of the Photogrammetry, RemoteSensing and Spatial Information Sciences 4 (2021): 121-127. (Year: 2021).

U.S. Appl. No. 17/960,185, 17/960,185, Prosecution History through Oct. 26, 2024.

Veluchandhar, V., and K. Kandavel. "WATS-SNADSC: A Wireless Asset Tracking System using Sensor Networks with Auto DetectSpy Camera in Forensic Science." J. Sci 1.4 (2008): 178-185. (Year: 2008).

U.S. Appl. No. 18/669,902, Notice of Allowance, Feb. 27, 2025.

U.S. Appl. No. 17/575,497, Final Office Action, Sep. 28, 2024.

U.S. Appl. No. 17/575,497, filed Jan. 13, 2022.

U.S. Appl. No. 18/885,679, filed Sep. 15, 2024.

U.S. Appl. No. 19/410,861, Continuation Application as filed Dec. 5, 2025.

U.S. Appl. No. 19/410,861, Notice Allowance, Nov. 10, 2025.

U.S. Appl. No. 18/407,659, Non-final Office Action Response, Aug. 29, 2025.

U.S. Appl. No. 18/407,659, Non-final Office Action, Jul. 29, 2025.

U.S. Appl. No. 18/885,679, Non-final Office Action, Jul. 29, 2025.

U.S. Appl. No. 18/885,679, Response to Non-Final Office Action, Dec. 16, 2025.

U.S. Appl. No. 18/885,679, Non-final Office Action, Oct. 3, 2025.

U.S. Appl. No. 18/407,659, Notice of Allowance, Sep. 25, 2025.

U.S. Appl. No. 18/885,679, final Office Action of Feb. 9, 2026, Available at USPTO Patent Center).

* cited by examiner

HOTEL MGMT SERVER (HMS) 120

HMS PROCESSOR (HMSP) 402

HMS USER PREF. ENGINE (HUPE) 404

HMS USER LOCATION ENGINE (HULE) 402

HMS HOTEL CONFIGURATION ENGINE (HCE) 406

142(3)

142(1)

140 LAN

142(2)

USER DEVICE ("UD") 110

UD PROCESSOR (UDP) 302

UD PRESENCE APP (UDPA) 306

UD LOCATION APP (UDLA) 304

USER UWB VIRTUAL TAG (UDVT) 114

144(2)

UWB ANCHOR (UDA) 112

144(3)

SET TOP BOX (STB) 102

STB PROCESSOR (STBP) 202

STB ROOM CONFIG. ENGINE (SRCE) 207

STB USER PREFERENCE ENGINE (SUPE) 206

STB USER LOCATION ENGINE. (SULE) 204

UWB ANCHOR (STBA) 200

144(1)

UWB TAG (UWBT) 104

USER DEVICE (UD) 110

UD PROCESSOR (UDP)
302

UD LOCATION APP (ULA)
304

UD PREFERENCE APP (UPA)
306

UD DATA STORE (UDDS)
308

UD USER LOCATION DATA
310

UD USER PREFERENCE
DATA
312

USER UWB VIRTUAL TAG (UDVT)
114

324

UD USER
INTERFACE
314

UD COMM.
INTERFACE
(UDCOM)
316

UD SECURITY
320

UD POWER
322

UWB ANCHOR
(UDA)
112

PERSON OCCUPANCY DETECTION IN HOTELS USING UWB TECHNOLOGY AND INTEGRATION WITH MATTER PROTOCOL IN STB

TECHNICAL FIELD

The technology described herein generally relates to devices, systems, and methods for detecting a presence of a person within a given area, such as a hotel, and controlling one or more devices based thereon.

BACKGROUND

Hotels, offices and other places open to the public (herein, such areas being a "hotel") commonly consume significant amounts of electricity due to the hotel being incapable of determining when a user is present/not present, entering/exiting, or otherwise utilizing one or more areas (e.g., a hotel room, an office, a gymnasium, a conference room, or the like, herein such areas being a "hotel room") of the hotel. Common approaches used today to reduce the quantity of electricity used, in configuring a given hotel area for use of by a given user, may include using key cards that are inserted into a card reader located within the hotel room and the like. While such approaches may reduce the quantity of electricity consumed, such approaches commonly result in a hotel room that is not configured in accordance with a given user's preferences, such as being too hot or too cold, not having the curtains opened or closed, not having an Internet connection established or disestablished for the user, not having one or more lights on or off, and the like.

Accordingly, devices, systems and methods are needed which address the above and other issues.

SUMMARY

Various implementations are described of devices, systems, and methods for user presence detection based configuring of a hotel room. For at least one implementation, a given hotel room may be configured for use by a given user based upon a detected presence of the given user relative to the hotel environs and at a given time. For at least one implementation, the detected presence of the user may be based on one or more signals generated by a smart tag, such as an ultra-wideband ("UWB") tag. A non-limiting example of a UWB tag is an AIRTAG by Apple Inc. of Cupertino, California. For at least one implementation, configuring of the hotel room may occur in accordance with one or more user preferences.

In accordance with at least one implementation of the present disclosure, a system of one or more computers can be configured to perform particular operations or actions by virtue of having software, firmware, hardware, or a combination thereof installed on the system that, in operation, cause(s) the system to perform the actions. One or more computer programs can be configured to perform particular operations or actions by virtue of including instructions that, when executed by a data processing apparatus, cause the apparatus to perform the actions.

For at least one implementation, a system may include a set top box ("STB") associated with a given room, a local area network ("LAN") coupled to the STB, a hotel management server ("HMS") coupled to the STB via the LAN, a user device ("UD"), configured for use by a given user, an ultra-wideband tag ("UWT"), and an electronic device coupled to the STB and located within the given room. The STB may include an STB processor ("STBP") and a non-transient STB data store ("STBDS"), coupled to the STBP. The STBP may non-transiently store: first computer instructions ("1CIs") which, when executed by the STBP, instantiate an STB user location engine ("SULE"), second computer instructions ("2CIs") which, when executed by the STBP, instantiate an STB user preference engine ("SUPE"), and third computer instructions ("3CIs") which, when executed by the STBP, instantiate an STB Room Configure Engine ("SRCE"). For at least one implementation, the SULE configures the STB to perform STB User Location Operations ("SULOs") including scanning at least one UWB frequency for a ranging signal transmitted by the UWT and, when the ranging signal is detected, determining whether the UWT is within an STB determined distance. The SULOs may further include, when the UWT is within the STB determined distance, receiving an association of at least one user preference with the UWT and configuring the electronic device in view of the at least one user preference.

For at least one implementation, when the ranging signal is detected, the SULOs further include determining whether the STB determined distance is within a threshold range. When the STB determined distance is within the threshold range, the SULOs may further include determining whether the STB determined distance is decreasing over time. When the STB determined distance is not within the threshold range, the SULOs may include continuing scanning of the at least one UWB frequency for another ranging signal from the UWT or another UWT.

For at least one implementation, the SULO of determining of whether the STB determined distance is decreasing over time may further include detecting, at a second time, a second ranging signal from the UWT, determining, based on the second ranging signal, a second STB determined distance of the UWT from the STB at the second time, determining, based on the STB determined distance and the second STB determined distance, whether the UWT is approaching the STB, and when affirmative, executing the 2CIs.

For at least one implementation, the SUPE may configure the STB to perform STB User Preference Operations ("SU-POs") which may include associating the UWT with a given user account.

For at least one implementation, the associating of the UWT with the given user account may further include receiving from the HMS an account identifier associated with the UWT, retrieving, from a data store accessible to the STB, the at least one user preference associated with the account identifier, and determining whether to configure the electronic device in the given room based on the at least one user preference.

For at least one implementation, the electronic device may be configured using MATTER commands generated by the UD. For an implementation, the electronic device may be a window covering. The at least one user preference may indicate that the window covering is to be configured into a first, closed state when the given user arrives at a first time of day and the at least one user preference may further indicate that the window covering is to be configured into a second, open state when the given user arrives at a second time of day.

For at least one implementation, the associating of the UWT with the given user account may further include receiving from the HMS an account identifier associated with the UWT, retrieving, from a data store accessible to the STB, the at least one user preference associated with the account identifier, and determining whether to apply the at least one user preference when configuring the electronic device in the given room for use by the given user.

For at least one implementation, the SRCE may configure the STB to perform STB Room Configure Operations ("SR-COs") which may include generating at least one command to configure the electronic device in view of the at least one user preference. The at least one command configures the electronic device prior to the user arriving at the room. The at least one command may be a MATTER protocol compliant command. The UWT may include a virtual ultra-wideband tag integrated into the UD.

For at least one implementation of the present disclosure, a method may include scanning, by an STB at least one UWB frequency for a ranging signal transmitted by an UWT. When the ranging signal is detected, the method may further include determining whether the UWT is within a determined distance of the STB. When the UWT is within the determined distance, the method may further include receiving at least one user preference for a given user associated with the UWT and configuring an electronic device, in a given room provided by a hotel operator, coupled to the STB in view of the at least one user preference.

For at least one implementation of the method, the UWT is a virtual ultra-wideband tag provided by a user device or a physical ultra-wideband tag provided by the hotel operator to the given user.

For at least one implementation of the method, the configuring of the electronic device may further include sending a MATTER command from the STB to the electronic device.

For at least one implementation of the method, the receiving of the at least one user preference may further include associating the UWT with a given user account, receiving from a hotel management system for the hotel operator an account identifier associated with the UWT, retrieving, from a data store accessible to the STB, the at least one user preference associated with the account identifier, and determining whether to configure the electronic device in the given room based on the at least one user preference.

For at least one implementation of the present disclosure, a computer readable medium may contain non-transient 1CIs, 2CIs, and 3CIs, wherein, when executed by a processor in an STB in a hotel room provided by a hotel operator, the 1CIs instantiate an SULE that configures the STB to perform SULOs, the 2CIs instantiate an SUPE that configures the STB to perform SUPOs, and the 3CIs instantiate an SRCE that configures the STB to perform SRCOs.

For at least one implementation, the SULOs may include scanning at least one UWB frequency for a ranging signal transmitted by a UWT. When the ranging signal is detected, the SULOs may further include determining whether the UWT is within an STB determined distance. When the UWT is within the STB determined distance, the SULOs may further include instantiating the SUPE.

For at least one implementation, the SUPOs may include associating the UWT with a given user account maintained by an HMS for the hotel operator, receiving from the HMS an account identifier associated with the UWT, retrieving, from a data store accessible to the STB, at least one user preference associated with the account identifier, and determining whether to configure an electronic device in the given room based on the at least one user preference. When a result of the determining is affirmative, the SUPOs may include instantiating the SRCE.

For at least one implementation, the SRCOs may include generating, by the STB, at least one command that configures the electronic device in view of the at least one user preference.

For at least one implementation of the computer readable medium, the UWT is a virtual ultra-wideband tag provided by a user device associated with the given user and the at least one command is a MATTER protocol compliant command.

BRIEF DESCRIPTION OF THE DRAWINGS

The features, aspects, advantages, functions, modules, and components of the devices, systems, and methods provided by the various implementations of the present disclosure are further disclosed herein regarding at least one of the following descriptions and accompanying drawing figures. In the appended figures, similar components or elements of the same type may have the same reference number and may include an additional alphabetic designator, such as 108a-108n, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When the first reference label is used in the specification, the description is applicable to any of the similar components and/or views having the same first reference label irrespective of any additional alphabetic designators or second reference labels, if any.

FIG. 1 is a schematic illustration of an implementation of a User Presence Configuring system ("UPC") and in accordance with at least one implementation of the present disclosure.

DETAILED DESCRIPTION

Figure 2:
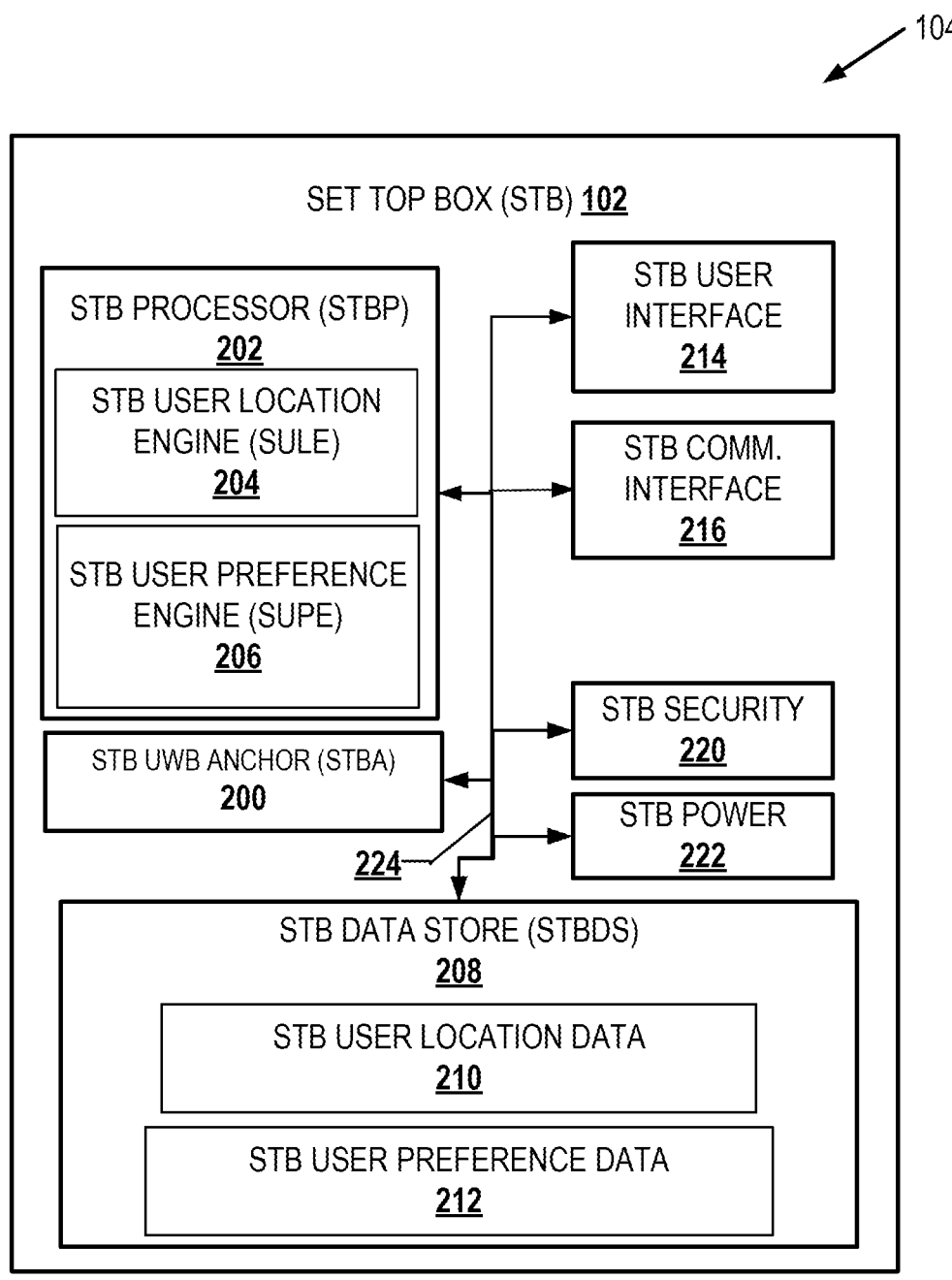
FIG. 2 is a schematic illustration of a STB configured for use in the UPC of FIG. 1 and in accordance with at least one implementation of the present disclosure.

Various implementations of the present disclosure describe devices, systems, and methods user presence detection based hotel room configuring.

"Additional I/O interface" (AIOI) herein refers to one or more components, provided with or coupled to a device, configured to support a receiving and/or presenting of additional inputs and outputs to and from one or more users. An AIOI may be configured to support the receiving and presenting of the additional I/O content (AIO) to users. Herein, the AIO, as communicated, may be referred to as "AIO signals." An AIO signal may include an audible signal or a visible signal and may be communicated separately or collectively therewith. An AIOI may include any interface not otherwise categorized as an Audio I/O interface or a Visual I/O interface with non-limiting examples including touch pads, keyboards, sensors, motion detectors, tactile elements, and the like. Any known or later arising technologies configured to convey information to or from one or more users as an AIO signal may be utilized for at least one implementation of the present disclosure. An AIOI includes hardware and computer instructions (herein, "AIO technologies") which supports the input and output of other signals with a user.

"Application" herein refers to a set of computer instructions that configure one or more processors to perform one or more tasks that are other than tasks commonly associated with the operation of the processor itself (e.g., a "system software," an example being an operating system software), or the providing of one or more utilities provided by a device (e.g., a "utility software," an example being a print utility). An application may be bundled with a given device or published separately. Non-limiting examples of applications include word processing applications (e.g., Microsoft WORD™), video streaming applications (e.g., SLINGTV™), video conferencing applications (e.g., ZOOM™), gaming applications (e.g., FORTNITE™), and the like.

"Audio I/O interface" herein refers to one or more components, provided with or coupled to an electronic device, configured to support a receiving and/or presenting of humanly perceptible audible content to one or more users. Such audible content (which is also referred to herein as being "audible signals") may include spoken text, sounds, or any other audible information. Such audible signals may include one or more humanly perceptible audio signals, where humanly perceptible audio signals typically arise between 20 Hz and 20 KHz. The range of humanly perceptible audio signals may be configurable to support an audible range of a given individual user. An audio I/O interface includes hardware and computer instructions (herein, "audio technologies") which supports the input and output of audible signals to a user. Such audio technologies may include, but are not limited to, noise cancelling, noise reduction, technologies for converting human speech to text, text to speech, translation from a first language to one or more second languages, playback rate adjustment, playback frequency adjustment, volume adjustments and otherwise. An audio I/O interface may use one or more microphones and speakers to capture and present audible signals respectively from and to a user. Such one or more microphones and speakers may be provided by a given device itself or by a device communicatively couple additional audible device component. For example, earbuds may be communicatively coupled to a smartphone, with the earbuds functioning as an audio I/O interface and capturing and presenting audio signals as sound waves to and from a user, while the smartphone functions as a UD. An audio I/O interface may be configured to automatically recognize, and capture comments spoken by a user and intended as audible signals for sharing with other users, inputting commands, or otherwise.

"Bus" herein refers to any known and/or later arising technologies which facilitate the transfer of data within and/or between components of a device. Non-limiting examples include Universal Serial Bus (USB), PCI-Express, Compute Express Link (CXL), IEEE-488 bus, High Performance Parallel Interface (HIPPI), and the like.

"Cloud" herein refers to cloud computing, cloud storage, cloud communications, and/or other technology resources which a given user does not actively manage or provide. A usage of a Cloud resource may be private (limited to various users and/or uses), public (available for multiple users and/or uses), hybrid, dedicated, non-dedicated, or otherwise. It is to be appreciated that implementations of the present disclosure may use Cloud resources to provide for processing, storage and other functions related to facilitating the features and functions described herein. An implementation may utilize Cloud resources using any known or later arising data delivery, processing, storage, virtualization, or otherwise technologies, standards, protocols (e.g., the Simple Object Access Protocol (SOAP), the Hyper Text Transfer Protocol (HTTP), Representational State Transfer protocol (REST), or the like. Non-limiting examples of such technologies include Software as a Service (SaaS), Platform as a Service (Paas), Infrastructure as a Service (Iaas), and the like. Cloud resources may be provided by one or more entities, such as AMAZON WEB SERVICES provided by Amazon.com Inc., AZURE provided by Microsoft Corp., and others.

"Communications Interface" herein refers to one or more separately provided components and/or integrated with other components of a Device that is configured to facilitate communication of data with one or more other devices using a Coupling. Non-limiting examples of communications interfaces including networking cards, Wi-Fi™ modules, Ethernet ports, Bluetooth radio modules, wireless radio modules, and the like. Any known or later arising components, technologies, protocols, communications mediums, or the like may be used as a communications interface in a given device in a sports results implications system.

"Component" herein refers to a Module of a Device, as further defined herein.

"Computer Data" herein refers to Data, as further defined herein.

"Computer engine" (or "engine") herein refers to a combination of a processor and computer instruction(s). A computer engine executes computer instructions to perform one or more logical operations (herein, a "logic") which facilitate various actual (non-logical) and tangible features and function provided by a system, a device, and/or combinations thereof.

"Computer instruction" herein refers to an Instruction, as further defined herein.

"Content" herein refers to data that that may be presented, using a suitable presentation device, to a user in a humanly perceptible format. When presented to a human, the data becomes "information." Non-limiting examples of content include images and graphics such as those related to television programs, streaming video, music, or otherwise. Content may include, for example and not by limitation, one or more sounds, images, video, graphics, gestures, or otherwise. The content may originate from any source, including live and/or recorded, augmented reality, virtual reality, computer generated, or otherwise. The content may be presented to a given user using any user device and any user interface. Content may be stored, processed, communicated, or otherwise utilized. Content may identify artists, events, venues or the like.

"Coupling" herein refers to the establishment of a communications link between two or more elements of a given device and/or system. A coupling may utilize any known and/or later arising communications and/or networking technologies, standards, protocols or otherwise. Non-limiting examples of such technologies include packet switch and circuit switched communications technologies, with non-limiting examples including, Wide Area Networks (WAN), such as the Internet, Local Area Networks (LAN), Public Switched Telephone Networks (PSTN), Plain Old Telephone Service (POTS), cellular communications networks such as a 3G/4G/5G or other cellular network, IoT networks, Cloud based networks, private networks, public networks, or otherwise. One or more communications and networking standards and/or protocols may be used, with non-limiting examples including, the TCP/IP suite of protocols, ATM (Asynchronous Transfer Mode), the Extensible Message and Presence Protocol (XMPP), Voice Over IP (VOIP), Ethernet, Wi-Fi, CDMA, Z-WAVE, Near Field Communications (NFC), GSM/GRPS, TDMA/EDGE, EV/DO, WiMAX, SDR, LTE, MPEG, BLUETOOTH, and others. A coupling may include use of physical data processing and communication components. A coupling may be physically and/or virtually instantiated. Non-limiting examples of physical network components include data processing and communications components including computer servers, blade servers, switches, routers, encryption components, decryption components, and other data security components, data storage and warehousing components, and otherwise. Any known or later arising physical and/or virtual data processing and/or communications components may be utilized for a given coupling.

"Data" herein refers to any representation of facts, information or concepts in a form suitable for processing, storage, communication, or the like by one or more electronic device processors, data stores, routers, gateways, or other data processing and/or communications devices and systems. Data, while and/or upon being processed, may cause or result in an electronic device or other device to perform or not perform at least one function, task, operation, provide a result, or otherwise. Data may be communicated, processed, stored and/or otherwise exist in a transient and/or non-transient form, as determined by any given state of such data, at any given time. For a non-limiting example, a given data packet may be non-transient while stored in a storage device, but transient during communication of the given data packet from a first device or system to a second (or more) device or system. When received and stored in one or more of a cache, a memory, a data storage device, or otherwise, the given data packet has a non-transient state. For example, and not by limitation, data may take any form including as one or more applications, content, or otherwise. Instructions, as further described herein, are a form of data.

"Data store" herein refers to any non-transient device, combinations of devices, component of a device, combinations of components of one or more devices, or the like configured to store data on a temporary, permanent, non-transient, or other basis. A data store is also referred to herein as a "computer readable medium" and/or a "non-transitory computer readable medium." A data store may store data in any form, such as electrically, magnetically, physically, optically, or otherwise. A data store may include a cache on a processor, memory devices, with non-limiting examples including random access memory (RAM) and read only memory (ROM) devices, and the like. A data store may include one more storage devices, with non-limiting examples including electrical storage drives such as EEPROMs, Flash drives, Compact Flash (CF), Secure Digital (SD) cards, Universal Serial Bus (USB) cards, and solid-state drives, optical storage drives such as DVDs and CDs, magnetic storage drives such as hard drive discs, magnetic drives, magnetic tapes, memory cards, and others. Any known or later arising data storage device technologies may be utilized for a given data store. Available storage provided by a given one or more data stores may be partitioned or otherwise designated by a storage controller as providing for permanent storage and temporary storage. Non-transient data, computer instructions, or other the like may be suitably stored in a data store permanently or temporarily. As used herein, permanent storage is distinguished from temporary storage, with the latter providing a location for temporarily storing data, variables, or other instructions used for a then arising or soon to arise data processing operations. A non-limiting example of a temporary storage is a memory component provided with and/or embedded onto a processor or integrated circuit provided therewith for use in performing then arising data calculations and operations. Accordingly, it is to be appreciated that a reference herein to "temporary storage" is not to be interpreted as being a reference to transient storage of data. Permanent storage and/or temporary storage may be used to store data which, while communicated may be transient or non-transient, but while stored, is defined herein to be a form of non-transient data.

"Device" and "electronic device" herein refer to any known or later arising electrical device configured to, singularly and/or in combination, communicate, manipulate, output (e.g., for presentation as information to a human), process, store, or otherwise utilize data. Non-limiting examples of devices include User Devices, Set Top Boxes, and Servers.

"Entity" refers to a human being, an animal, a robot, an artificial intelligence, or a combination or collection of two or more of the foregoing that participate in a given event.

"Information" herein refers to data that is converted into a humanly perceptible and understandable format. Information is presented to one or more users using one or more User Interfaces (as defined below).

"Instruction" herein refers to a non-transient processor executable instruction, associated data structures, sequence of operations, program modules, or the like. An instruction is described by an instruction set. It is commonly appreciated that instruction sets are often processor specific and accordingly an instruction may be executed by a processor in a language format (e.g., a machine language format) that is translated from a higher level programming language (e.g., C++). An instruction may be provided using any form of known or later arising programming; non-limiting examples including declarative programming, imperative programming, functional programming, procedural programming, stack based programming, object-oriented programming, and otherwise. An instruction may be performed by using data and/or content stored in a data store on a transient and/or non-transient basis, as may arise for any given data, content and/or instruction.

"Module" herein refers to and, when claimed, recites definite structure for a device, and/or one or more components thereof, that is configured to provide at least one feature and/or output signal and/or perform at least one function including one or more of the features, output signals and functions described herein. A module may provide the one or more functions using computer engines, processors, computer instructions, and the like. When a feature, output signal and/or function is provided, in whole or in part, using a processor, one more software components may be used, and a given processor may include a processor module configured to execute computer instructions. The specific hardware and/or computer instructions used for a given implementation will depend upon the functions to be accomplished by a given module. Likewise, the computer instructions may be provided in firmware, as embedded software, provided in a remote and/or local data store, accessed from other sources on an as-needed basis, or otherwise. Any known or later arising technologies may be used to provide a given module and the features and functions supported therein.

"PHOSITA" herein refers to a person having ordinary skill in the art.

"Power Supply/Power/Power Module" herein refers to any known or later arising technologies which facilitate the providing to and/or use by a device of electrical power. Non-limiting examples of such technologies include batteries, power converters, inductive charging components, line-power components, solar power components, and otherwise.

"Processor" herein refers to one or more known and/or later developed hardware processors and/or processor systems configured to execute one or more computer instructions, with respect to one or more instances of computer data, and perform one or more logical operations. The computer instructions may include instructions for executing one or more applications, software engines, and/or processes configured to perform computer executable operations. Such hardware and computer instructions may arise in any computing configuration including, but not limited to, local, remote, distributed, blade, virtual, or other configurations and/or system configurations. Non-limiting examples of processors include discrete analog and/or digital components that are integrated on a printed circuit board, as a system on a chip (SOC), or otherwise; Application specific integrated circuits (ASICs); field programmable gate array (FPGA) devices; digital signal processors; general purpose processors such as 32-bit and 64-bit central processing units; multi-core ARM based processors; microprocessors, microcontrollers; and the like. Processors may be implemented in single or parallel or other implementation structures, including distributed, Cloud based, and otherwise.

"Security Component/Security/Security Module" herein refers to any known or later arising components, processors, computer instructions, modules, and/or combinations thereof configured to secure data as communicated, processed, stored, output for presentation to a user, or otherwise manipulated. Non-limiting examples of security components include those which implement encryption/decryption standards, such as an Advanced Encryption Standard (AET), and transport security standards, such as Transport Layer Security (TLS) or Secure Sockets Layer (SSL).

"Server" herein refers to one or more devices that include computer hardware and/or computer instructions that provide functionality to one or more other programs or devices (collectively, "clients"). Non-limiting examples of servers include content servers, database servers, file servers, application servers, web servers, communications servers, virtual servers, computing servers, and the like. Servers may be combined into clusters (e.g., a server farm), logically or geographically grouped, combined into neural networks, or otherwise configured and/or utilized. Any known or later arising technologies may be used for a server.

A server may instantiate one or more computer engines as one or more threads operating on a computing system having a multiple threaded operating system, such as the WINDOWS, LINUX, APPLE OS, ANDROID, and other operating systems, as an application program on a given device, as a web service, as a combination of the foregoing, or otherwise. An Application Program Interface (API) may be used to support an implementation of the present disclosure. A server may be provided in the virtual domain and/or in the physical domain. A server may be associated with a human user, a machine process executing on one or more computing devices, an API, a web service, instantiated on the Cloud, distributed across multiple computing devices, or otherwise. A server may be any electronic device configurable to communicate data using a network, directly or indirectly, to another device, to another server, or otherwise.

"Set Top Box" (STB) herein refers to one or more devices, servers, data stores, communications interfaces, and related components which, singularly and/or cooperatively, facilitate one or more features and functions of the present disclosure. An STB may include one or more processors, data stores, communications interfaces, user interfaces, busses, and related components. Non-limiting examples of STBs include satellite receivers, such as a HOPPER™ by DISH Network L.L.C. of Englewood, Colorado, streaming devices, such as an APPLE TV® by Apple, Inc. of Cupertino California, a streaming application and/or streaming server, such as a NETFLIX® application and/or NETFLIX server provided by Netflix Inc. of Los Gatos, California, a smart television, such as a QEIC QLED 4K® television by Samsung corporation of Samsung Digital City, South Korea, a cable receiver, such as an X1® television box by XFINITY Inc., a division of Comcast Inc. of Philadelphia, Pennsylvania, and/or any other device, component, software, application or the like configured to singularly or cooperatively facilitate one or more features and functions of the present disclosure. The STB devices, components and the like may be physically, logically, virtually, or otherwise grouped and/or coupled to facilitate the one or more features and functions including, but not limited to, those identified herein.

"Substantially simultaneous(ly)" herein refers to an absence of a greater than expected and humanly perceptible delay between a first event or condition and a second event or condition. Substantial simultaneity may vary in a range of quickest to slowest expected delay, to a moderate delay, or to a longer delay.

"User" herein refers to one or more of a single person, a household of people (such as those in a family), a collection of people (e.g., those in a fraternal organization or a club), or any other association of one or more human beings. A given household may have multiple users and/or collections of users (e.g., parents being one collection of users with children being a second collection of users in a household).

"User Device (UD)" herein refers to a device configured for use by a user to communicate, generate, compute, present, process, store, or otherwise manipulate data and/or information. Non-limiting examples of user devices include smartphones, laptop computers, tablet computing devices, desktop computers, smart televisions, smart glasses, virtual reality glasses, augmented reality glasses, earbuds/headphones and other audible output devices, and other devices.

"User Interface" herein refers to one more components, provided with or coupled to a device configured to receive information from and/or present information to a user and convert information to data and vice versa. A user interface may include one more Additional I/O interfaces, Audio I/O interfaces, and Visual I/O interfaces.

"Visual I/O interface" herein refers to one or more components, provided with or coupled to a device, configured to support a receiving and/or presenting of humanly percep- tible visual content to one or more users. A visual I/O interface may be configured to support the receiving and presenting of visual content (which is also referred to herein as being "visible signals") to users. Such visible signals may be in any form, such as still images, motion images, aug- mented reality images, virtual reality images, and otherwise. A visual I/O interface includes hardware and computer instructions (herein, "visible technologies") which supports the input by and output of visible signals to users via a device. Such visible technologies may include technologies for converting images (in any spectrum range) into humanly perceptible images, converting content of visible images into a given user's perceptible content, such as by character recognition, translation, playback rate adjustment, playback frequency adjustment, and otherwise. A visual I/O interface may be configured to use one or more display devices, such as an internal display and/or external display for a given device with the display(s) being configured to present visible signals to a user. A visual I/O interface may be configured to use one or more image capture devices to capture content. Non-limiting examples of image capture devices include lenses, cameras, digital image capture and processing soft- ware, and the like. Accordingly, it is to be appreciated that any existing or future arising visual I/O interfaces, devices, systems and/or components may be utilized by and/or in conjunction with a device to facilitate the capture, commu- nication and/or presentation of visible signals to a user.

User Presence Configuring System (UPC) 100

As shown in FIG. 1 and for at least one implementation of the present disclosure, a User Presence Configuring System (UPC) 100, may include a set top box (STB) 102, a user device (UD) 110, a hotel management server (HMS) 120 operated by a hotel opertor, and an ultra-wideband tag (UWT). A UWT may be provided as an ultra-wideband physical tag ("UPT") 104 and/or as an ultra-wideband virtual tag ("UVT") 114. Herein, UPTs 104 and UVTs 114 are individually and collectively referred to as a UWT. The STB 102, UD 110 and HMS 120 may be coupled by a local area network ("LAN") 140 using respective LAN couplings 142, including a first LAN coupling 142(1), a second LAN coupling 142(2), and a third LAN coupling 143(3).

The STB 102 may include an STB ultra-wideband anchor ("STBA") 200 that may be coupled, via a first UWB coupling 144(1), to the UPT 104 when the UPT 104 is within range of the STBA 200. The UD 110 may include a User Device ultra-wideband Anchor ("UDA") 112 and an UVT 114. When the UD is within range, the UDA 112 may be coupled to the STB 102 via a second UWB coupling 144(2). When within range, the UPT 104 may be coupled to the UDA 112 by a third UWB coupling 144(3). The UDA 112 may function as an intermediary and couple the UPT 104 to the STBA 200 via the second UWB coupling 144(2) and the third UWB coupling 144(3).

For at least one implementation, the first UWB coupling 144(1), second UWB coupling 144(2), and third UWB coupling 144(3) may utilize one or more frequencies exceeding five-hundred Megahertz (500 MHz). For at least one implementation, a UWT may be configured to transmit data over distances of one to fifty meters (1-50 m). For at least one implementation, a UWT may be configured to transmit data up to a distance of two-hundred meters (200 m). It is to be appreciated that a UWT may be configured to consume varying levels of power depending on a then arising distance of the first UWB coupling 144(1), second UWB coupling 144(2), and the third UWB coupling 144(3). For at least one implementation, a UWT may periodically generate a ranging signal that includes therein a transmission time. The ranging signal may be received by a given UWB anchor, at a given reception time. Based on differences between the transmission and reception times, a UWB anchor may determine a distance of the UWT from the given UWB anchor at the given transmit time.

STB 102

As shown in FIG. 2 and for at least one implementation, the STB 102 includes an STB processor (STBP) 202 that is configured to execute computer instructions including first computer instructions (1CIs) for instantiating an SULE 204, second computer instructions (2CIs) for instantiating a SUPE 206, and third computer instructions (3CIs) for instantiating the SRCE 207. The STBP 202 is coupled, by an STB bus 224, to the STBA 200, an STB data store ("STBDS") 208, an STB user interface 214, an STB com- munications interface ("STBCOM") 216, an STB security module 220, and an STB power module 222. As discussed above, the STBP 202 may be configured to execute the SULE 204 and the SUPE 2026. Other applications, engines, and modules such as content processing applications, web browser applications, and the like may also be executed by the STBP 202. The STBDS 208 is configured to store the STB user location data 210 and STB user preference data 212. Other data may be stored by the STBDS 208. The STB 102 may also include an STB user interface 214, an STB communications interface 216, an STB security module 220, and an STB power module 222. An STB bus 224 couples the STB 102 components.

SULE 204, SUPE 206 and SRCE 207

The STBP 202 may be configured to execute the 1CIs which instantiate the SULE 204, the 2CIs which instantiate the SUPE 206, and the 3CIs which instantiate the SRCE 207. One or more of the 1CIs, 2CIs and 3CIs may be stored in the STBDS 208, provided on the Cloud, or otherwise accessible by the STBP 202.

Figure 5:
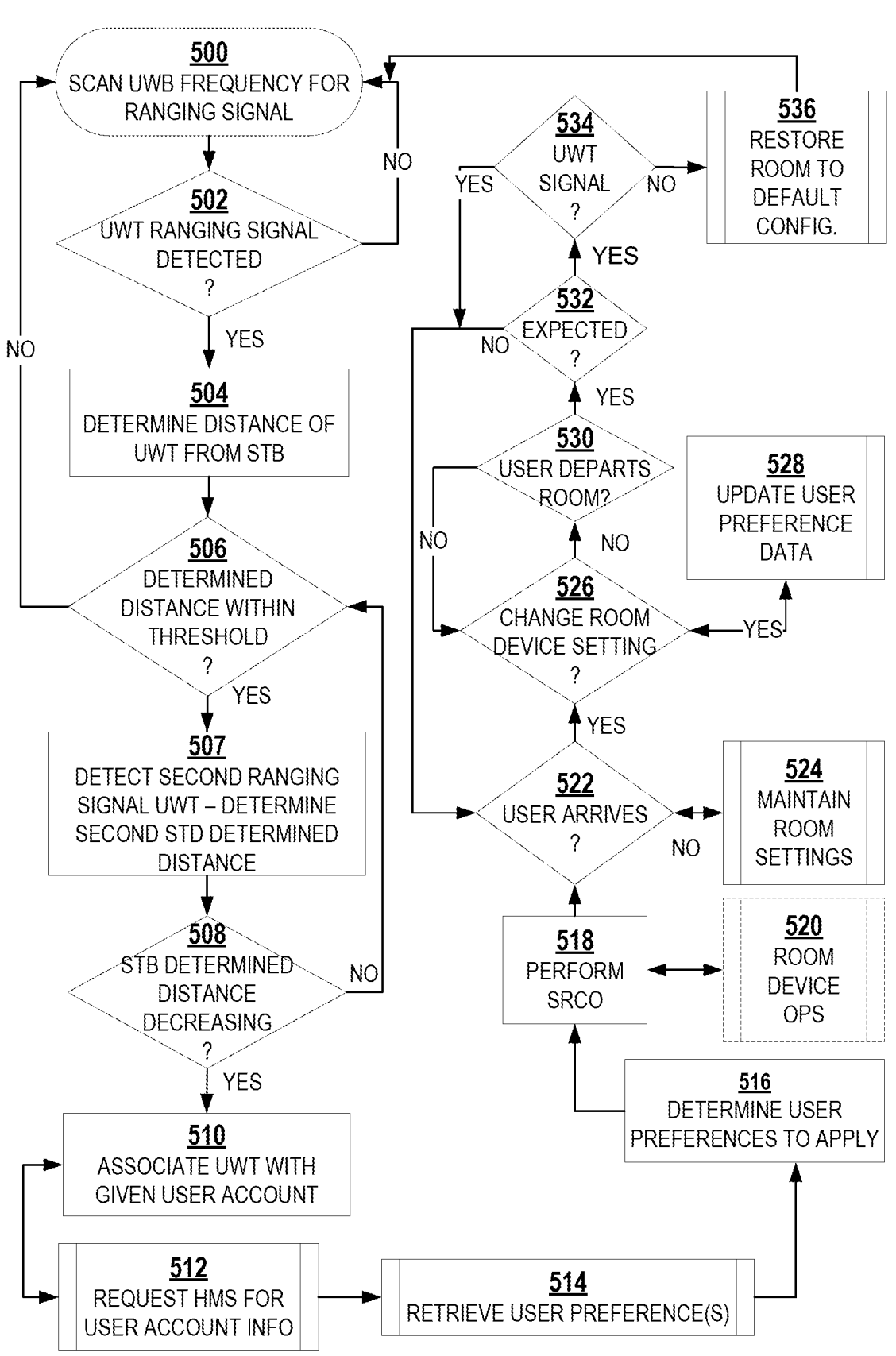
FIG. 5 is a flow chart illustrating operations performed by one or more of an SULE, SUPE, and SRCE instantiated by an STB for a UPC and in accordance with at least one implementation of the present disclosure.

As shown in FIG. 5 and in accordance with at least one implementation of the present disclosure, operations of other SULE 204, SUPE 206 and SRCE 207 are depicted. The SULE 204 performs one or more STB User Location Operations (SULOs), as depicted by Operations 500-508, and thereby detects a presence and a range of a given UWT from the STBA 200. The SUPE 206 performs one or more STB User Preference Operations (SUPOs), as depicted by Operations 510-516, and thereby determines one or more user preferences associated with a given UPT 104 and/or UVT 114. The SRCE 207 performs one or more STB Room Configuration Operations (SRCOs), as depicted by Opera- tions 518-536 and thereby configures a given hotel room for use by a given user and at a given time.

As per Operations 500-502 and for at least one imple- mentation of the present disclosure, the SULOS may include the STBP 202 instructing the STBCOM 216 to scan one or more UWB frequencies for an UWB ranging signal emitted by a UWT. For at least one implementation, the STB 102 may be configured to scan a specific UWB frequency and/or a range of UWB frequencies that are supported by the UWT. When an initial ranging signal is detected, the UWT may be designated as a "detected UWT" and the operations continue with Operation 504.

As per Operation 504 and for at least one implementation, the SULOS may include the STBP 202 determining a first distance of the detected UWT from the STB 102. As used herein as an "STB determined distance" (which may be referred to as a "first," "second," or nth STB determined distance, is the distance of the detected UWT from the STB 102 at a given time, such as at a first time, a second time, or an nth time where the first time and first determined distance occur before the second time and second determined distance. It is to be appreciated that for at least one implementation, the STB determined distance of the detected UWT may be a specified distance of the detected UWT from the STB 102, where the specified distance is not specified in terms of one or more orientations of the STB 102 to the detected UWT. For another implementation, the STBCOM 216 may be configured to determine an orientation (herein, the "STB determined orientation") of the detected UWT by use of one or more directional antennas, signal processors, or the like. For example, the STBCOM 216 may be configured to include antenna and/or other receiving devices that are configured to receive ranging signals within a given arc such as within a ninety-degree (90°) of a given orientation, within an omni-direction, e.g., three-hundred and sixty degrees (360°), or otherwise.

As per Operation 506 and for at least one implementation, the SULOs may include the STBP 202 determining whether a first determined distance is within a threshold range. For at least one implementation, the threshold range may be used to determine whether the STBP 202 is to execute the 2CIs and 3CIs. If "NO," the first determined distance is not within the threshold range and the operations continue with Operation 500. If "YES," the first determined distance is within the threshold range and the operations continue with Operation 508.

As per Operation 507 and for at least one implementation, the SULOs may include the STBP 202 instructing the STB 102 to further scanning for a second ranging signals from the detected UWT, receiving the second ranging signal and determining, based on the second ranging signal, a second STB determined distance of the detected UWT from the STB 102.

As per Operation 508 and for at least one implementation, the SULOs may include the STBP 202 determining, based on the first STB determined distance and one or more second STB determined distances whether the distance of the detected UWT from the STB 102 is decreasing. The SULE 204 may be configured to determine that when the determined distance decreases over time, a given user associated with the detected UWT may be proceeding to their assigned hotel room or other location in which the STB 102 is located. When "NO," the STB determined distance is not decreasing over time and the operations continue with Operation 506. When "YES," the determined distance is decreasing over time and the STBP 202 executes the 2CIs and thereby instantiates the SUPE 206 and performs the SUPOs, as shown by Operations 510-516.

As per Operation 510 and for at least one implementation, the SUPOs may include the STBP 202 associating the detected UWT with a given user account. To so associate and for at least one implementation, the STBP 202 may send a request to the HMS 120, which may respond by retrieving and providing to the STBP 202 one or more user account identifiers associated with the UWT, as shown by Operation 512.

As per Operation 514 and for at least one implementation, the SUPOs may include retrieving STB user preference data 212, as stored by the STBDS 208, associated with the user account identifier retrieved by the HMS 120 in Operation 512.

As per Operation 516 and for at least one implementation, the SUPOs may include determining which, if any, of the user preferences to apply to the hotel room associated with the STB 102, such user preferences herein being the "applicable user preferences." It is to be appreciated that an applicable user preference may correspond to one or more times of day, day of week, calendar day, or the like. For example, a user preference for a given hotel room blinds configuration (e.g., open, closed, half-open, etc.) may vary for a given user based on whether it is day or night, whether the sun is then brightly shining on the window or not, and the like.

As per Operations 518 and for at least one implementation, based on the applicable user preferences, the STBP 202 may execute the 3CIs and instantiate the SRCE 207. The SRCE 207 performs one or more SRCOSs and thereby instructs one or more devices into one or more configurations and thereby configures the hotel room in accordance with the applicable user preferences.

As per Operation 520 and for at least one implementation, one or more devices in the given hotel room may be configured. For example, a television device may be powered on, tuned to a given channel or stream, and have its output sound volume adjusted. For another example, an air conditioning device may be configured into a heating, cooling, recirculating, panning, or other operational state. A temperature setting in a thermostat may be raised or lowered. A window covering may be opened, closed, or the like. It is to be appreciated that the STBCOM 216 may include one or radio frequency ("RF") modules, such as a Wi-Fi™, Bluetooth™, Ethernet, Zigbee™ or other forms of device control module(s) by which one or more devices within a given hotel room associated, at a given time with a given user, may be configured into one or more states.

As per Operations 522-524 and for at least one implementation, the SCROs may include awaiting the user's arrival at the hotel room and maintaining one or more room settings until user arrival occurs.

As per Operations 526-528 and for at least one implementation, the process may include determining whether the user changes one or more room device settings. And, if so, updating one or more user preference data stored in the STBDS 208. For example, a user may adjust a temperature a given time after entering the hotel room and/or after a period of time in the hotel room.

As per Operations 530-532 and for at least one implementation, the SCROs may include determining if the user has departed the room and, if so, whether the user's departure is expected. It is to be appreciated that a user's departure may be expected based upon one or more calendar events associated with the user. For example, a user attending a conference may be expected to depart the hotel room to attend an opening or keynote presentation for the conference, as maintained on a hotel wide conference calendar that is accessible to the STB 102 and maintained by the HMS 120.

As per Operations 534-536 and for at least one implementation, the SCROs may include determining whether a ranging signal from the detected UWT is within a given proximity of the hotel room. If "YES", one or more of the hotel room configuration settings may remain unchanged and the process may continue at Operation 522. If "NO," the process may proceed to Operation 536 and one or more of the hotel room configuration settings may be restored to a default configuration setting. The process may then continue with Operation 500.

It is to be appreciated that the operations shown in FIG. 5 may be performed in a different order, sequence, or otherwise. Provided that at least one setting of at least one device in a hotel room is configured in accordance with at least one user preference and the configuring thereof occurs prior to arrival of a given user to the hotel room and in view of a determined location of the user relative to the hotel room.

User Device (UD) 110

Figure 3:
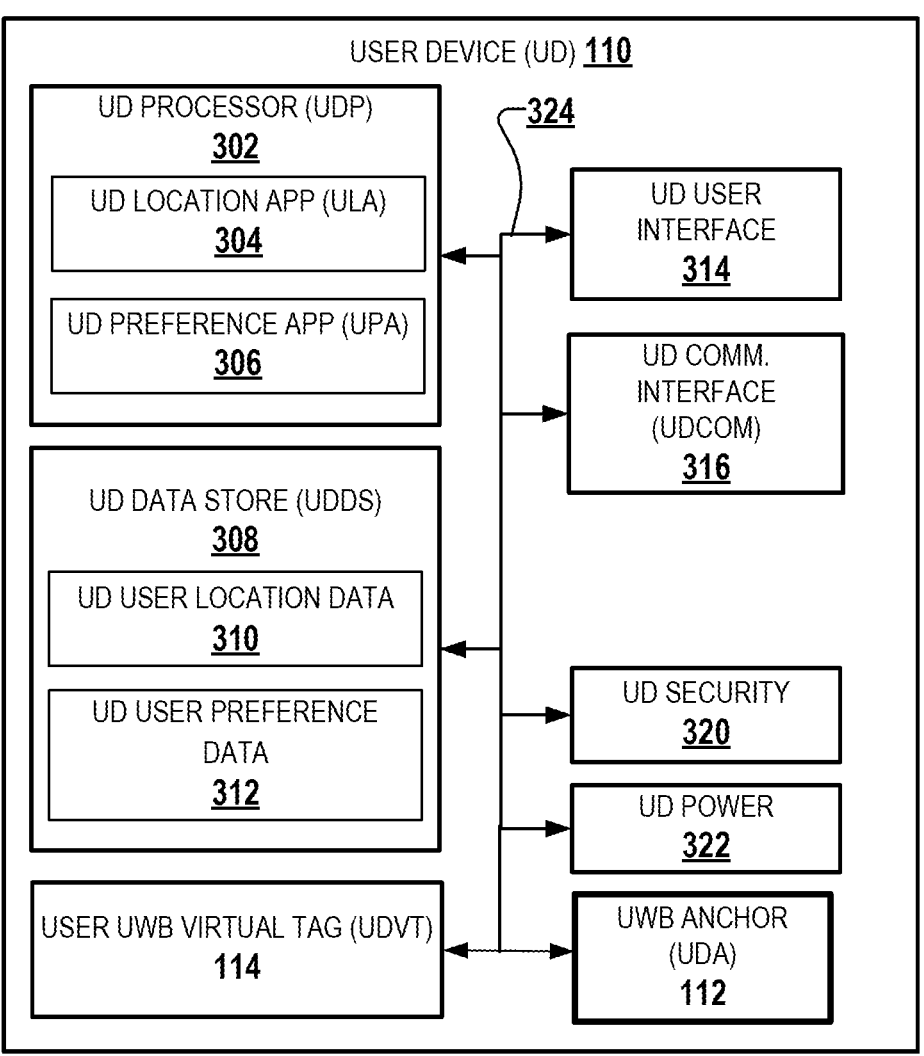
FIG. 3 is a schematic illustration of an UD configured for use in the UPC of FIG. 1 and in accordance with at least one implementation of the present disclosure.
Figure 6:
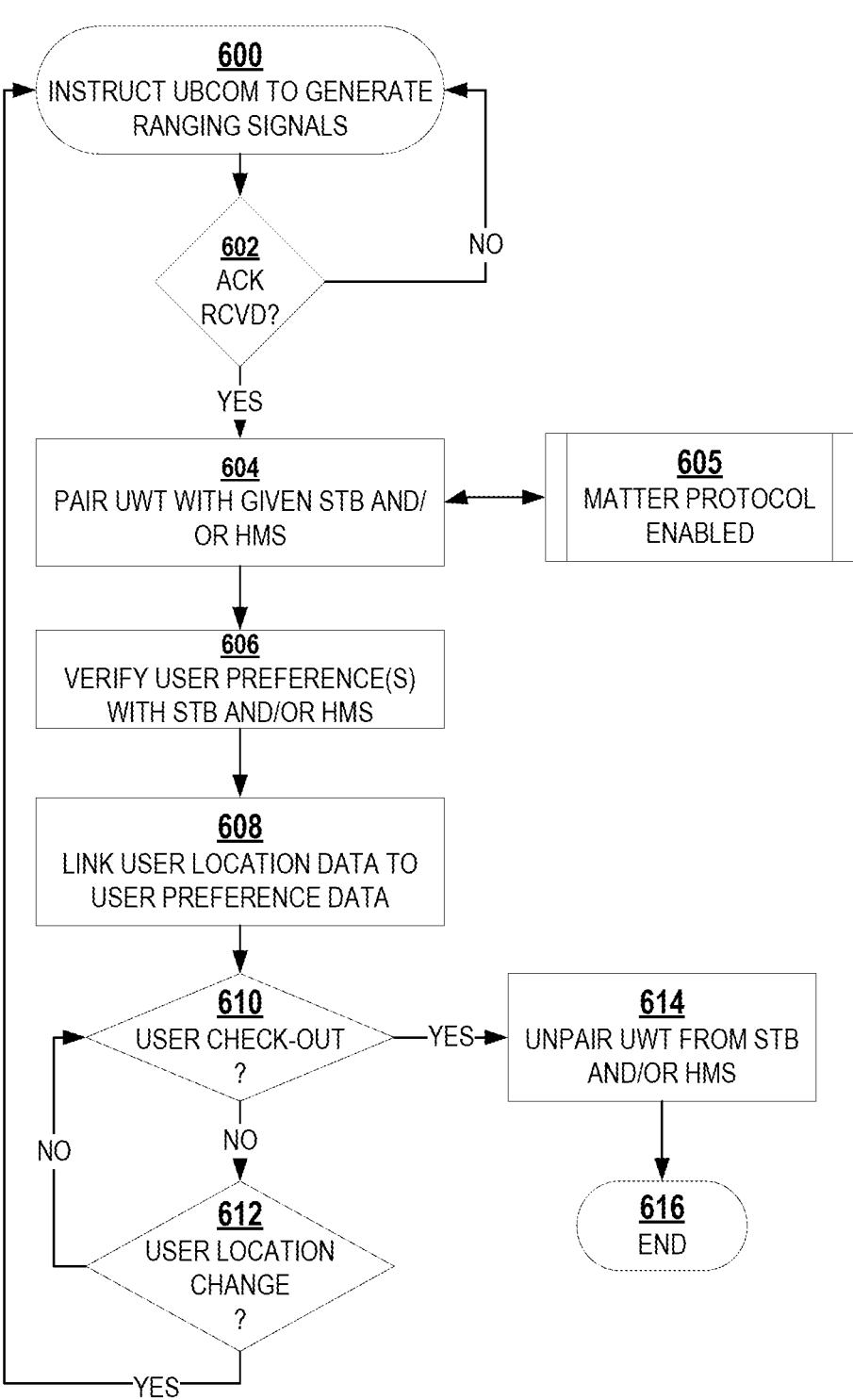
FIG. 6 is a flow chart illustrating operations performed by one or more of a UD Location Application ("ULA") and a UD Preference Application ("UPA") instantiated by a UD for a UPC and in accordance with at least one implementation of the present disclosure.

As further shown in FIG. 3 and for at least one implementation, the UD 110 may include a UD processor ("UDP") 302, the UDA 112, and the UVT 114. The UDP 302 may execute fourth computer instructions ("4CIs") which instantiate the ULA 304 and fifth computer instructions ("5CIs") which instantiate the UPA 306. Operations performed by the ULA 304 and the UPA 306 are shown in FIG. 6 and described below. Other applications, such as content processing applications, web browser applications, and the like may also be executed by the UDP 302. The UD 110 may include a UD data store ("UDDS") 308 configured to store, in one or more data files, data sets, data collections or the like (herein, "data sets"), UD user location data 310 and UD user preference data 312. Other data may be stored by the UDDS 308. The UD 110 may also include a UD user interface 314, a UD communications interface ("UDCOM") 316, a UD security module 320, and a UD power module 322. A UD bus 324 couples the UD 110 components.

ULA 304 and UPA 306

The UDP 302 may be configured to execute the 4CIs which instantiate the ULA 304 and the 5CIs which instantiate the UPA 306. One or more of the 4CIs and 5CIs may be stored in the UDDS 308, provided on the Cloud, or otherwise accessible by the UDP 302.

As shown in FIG. 6 and in accordance with at least one implementation of the present disclosure, operations of other ULA 304 and UPA 306 are depicted. The ULA 304 performs one or more UD User Location Operations ("ULOs"), as depicted by Operations 600-604 and 610-616 and thereby detects a presence and a range of a given detected UWT associated with the UD 110 to a given STB 102. The UPA 306 performs one or more UD User Preference Operations ("UPOs"), as depicted by Operations 606-608, and thereby determines one or more user preferences associated with a given STB 102.

As per Operation 600 and for at least one implementation of the present disclosure, the ULOs may include the UDP 302 instructing the UDCOM 316 to generate one or more ranging signals at one or more UWB frequencies. The ranging signals may be generated at any given UWB frequency and/or frequencies that are supported by a STB 102 and/or HMS 120 and for a given implementation of the present disclosure. Given the breadth of available UWB frequencies-such breadth spanning from five-hundred megahertz (500 MHz) to beyond five gigahertz (5 GHz)—it is to be appreciated that a given STB 102 and/or HMS 120 may be configured to communicate (receive and send) data at one or more specified frequencies, e.g., 2.4 GHz, while not being configured to communicate data at other frequencies, e.g., 5 gHz. The UDCOM 316 may be configured to generate ranging signals at multiple UWB frequencies. For at least one implementation, an STBP 202 may be configured to enable a user to enable/disable the UDCOM 316 from generating a ranging signal and/or providing of a UWB number associated with a given UD 110 to any other device and at any time.

As per Operation 602 and for at least one implementation, the ULOs may include determining whether an acknowledgement signal has been received from an STB 102 and/or an HMS 120. If "NO," the process may return to Operation 600. It is to be appreciated that the UD 110 may instruct a UWT to periodically send, e.g., on a pulse interval or otherwise, the ranging signals. For at least one implementation, the UD 110 may instruct a UWT to send ranging signals based on a location of the UD 110. For at least one implementation, such location may be determined using a location determination system provided with the UD 110, such as a Global Positioning System ("GPS") receiver or the like. For at least one implementation, the UWT may include a UPT 104 that is physically provided to a user and/or a UVT 114 that is virtually provided to a user when they check into a hotel and/or sign-in to an HMS 120 associated with a given hotel. Upon such physical and/or virtual providing, the UPT 104 may be configured to generate ranging signals until the UPT 104 is returned to the hotel or otherwise deactivated and/or until the UVT 114 is inactivated, e.g., upon the user checking out of the HMS 120. If "YES," the ULO may continue with Operation 604.

As per Operation 604 and for at least one implementation, upon receiving an acknowledgement message from an STB 102 and/or an HMS 120, the ULOs may include pairing the detected UWT with the HMS 120. It is to be appreciated that when the detected UWT is paired directly with a given STB 102, the given STB 102 may be configured to communicated identifying information for the detected UWT to the HMS 120 associated with the given STB 102, as per Operations 510 and 512. It is to be appreciated that pairing of the detected UWT with the HMS 120 may include the use of cryptology, including but not limited to the use of hash keys, security keys and the like. The STB 102, UD 110 and HMS 120 may be configured to utilize their corresponding security modules (i.e., the STB security module 220, the UD security module 320, and the HMS security module 422) to facilitate the secure exchange of data by and between the STB 102, UD 110 and HMS 120.

As per Operation 605 and for at least one implementation, the STBP 202 may be configured to implement the MATTER protocol and/or other protocols and send commands which are MATTER compliant that facilitate use and control of one or more electronic devices within a given hotel room, hotel area, or otherwise. As is well known in the art, the MATTER protocol, which is published by the Connectivity Standards Alliance, located in Davis, California, USA, enables a given first device (e.g., a UD 110) to control a second device (e.g., a television) using a unified protocol. As shown, use of the MATTER protocol may occur upon pairing of the detected UWT with a given STB 102 and/or HMS 120. One or more of the STB 102, for a given hotel room and/or hotel area, and the HMS 120 may be configured to enable, limit, permit, control or otherwise control electronic devices accessible to the given UD, as per Operation 605. For at least one implementation, the MATTER protocol may be used along with the Internet to connect a centralized HMS 120 with multiple hotels (or other buildings) within a given area, such as a neighborhood, city, county, region, country, or the like. The centralized HMS 120 may be configured to monitor and control configurations of one or more rooms in the multiple hotels.

As per Operation 606 and for at least one implementation, upon pairing of the detected UWT with the given STB 102 and/or HMS 120, the ULO may invoke one or more UPOs to be performed by the UPA 306. Such UPOs may include verifying one or more user preferences (which the UD 110 may store as UD user preference data 312) with user preference data accessible to the STB 102 (which the STB 102 may store as STB user preference data 212) and/or to the HMS 120 (which the HMS 120 may store as HMS user preference data 414). It is to be appreciated that a given user's user preferences may vary over time, by STB, HMS, location, or otherwise. Accordingly, per Operation 606 a verification may be performed whereby the given user's current preferences may be verified, modified and/or updated for use during the given user's visit to the hotel by one or more of the given STB 102 and/or the HMS 120.

As per Operation 608 and for at least one implementation, the UPOs may include determining whether to link a current location as specified, e.g., by a location of a given STB 102 and/or HMS 120 to which the given UD 110 has been paired (per Operation 604), and stored as a given set of UD user location data 310, with a current set of UD user preference data 312 (as verified, modified and/or updated per Operation 608). The linking of such data sets may facilitate use of location specific user preferences based on STB 102 and/or HMS 120 location. For example, a given user may have a preference for a hotel room located on a particular side of a given hotel while having a preference for another hotel room located on a different side of another hotel. Such preferences may arise in accordance with noise profiles, views, whether on a sunrise or sunset side of a given hotel, and/or other factors that may be particular to the different hotel rooms, the hotels, the area in which the hotel is situated, or otherwise. By linking the user location data with the user preference data, the SRCE 207 and HCE 408 may facilitate individualization of a given hotel room and/or other hotel facilities to a given user.

As per Operation 610 and for at least one implementation, the ULA may include determining if the given user has initiated a check-out or other departure routine from the hotel. It is to be appreciated that a user checking-out may occur via any known or later arising technologies and/or approaches, including web based check-out, in-person checkout as may occur at a hotel reception desk, return of a UPT 104 to a bin, cradle or other location configured to receive and reset a given UPT 104 to a default state, or otherwise. If "NO," the process may continue with Operation 612. If "YES," the process may continue with Operation 614.

As per Operation 612 and for at least one implementation, the ULA may determine whether the given user has changed their location. For at least one implementation, a threshold for a given "user location change" may be defined in terms of a given STB's location, areas internal to a hotel's environs, areas external to a hotel's environs, or otherwise. It is to be appreciated that the threshold for a "user location change" may be fixed (e.g., based on a change in an immediate past location to a present location exceeding a given threshold such as ten meters (10 m), may vary by time, day, location, or otherwise, may vary based on a given STB 102 to which a given UD 110 is currently paired (e.g., a pairing of a given UD 110 to an STB 102 in a hotel room may have a different threshold than a pairing of the given UD 110 to an STB 102 located in a conference room). Further, a given user location change may be determined using any known or later developed location determination technologies with a non-limiting example including GPS. When "NO" and a "user location change" is not detected, the ULOs may continue with Operation 610. When "YES" and a "user location change" is detected, the ULOs may continue with Operation 600, whereby the UD 110 resumes generating ranging signals and seeks to establish a link with one or more STBs 102.

As per Operation 614 and for at least one implementation, the ULA may perform operations which disconnect the UD 110 from the given STB 102 and/or HMS 120 with which the UD 110 was previously paired (as per Operation 604). The ULOs and UPOs may then end at Operation 616.

Hotel Management Server (HMS) 120

Figure 4:
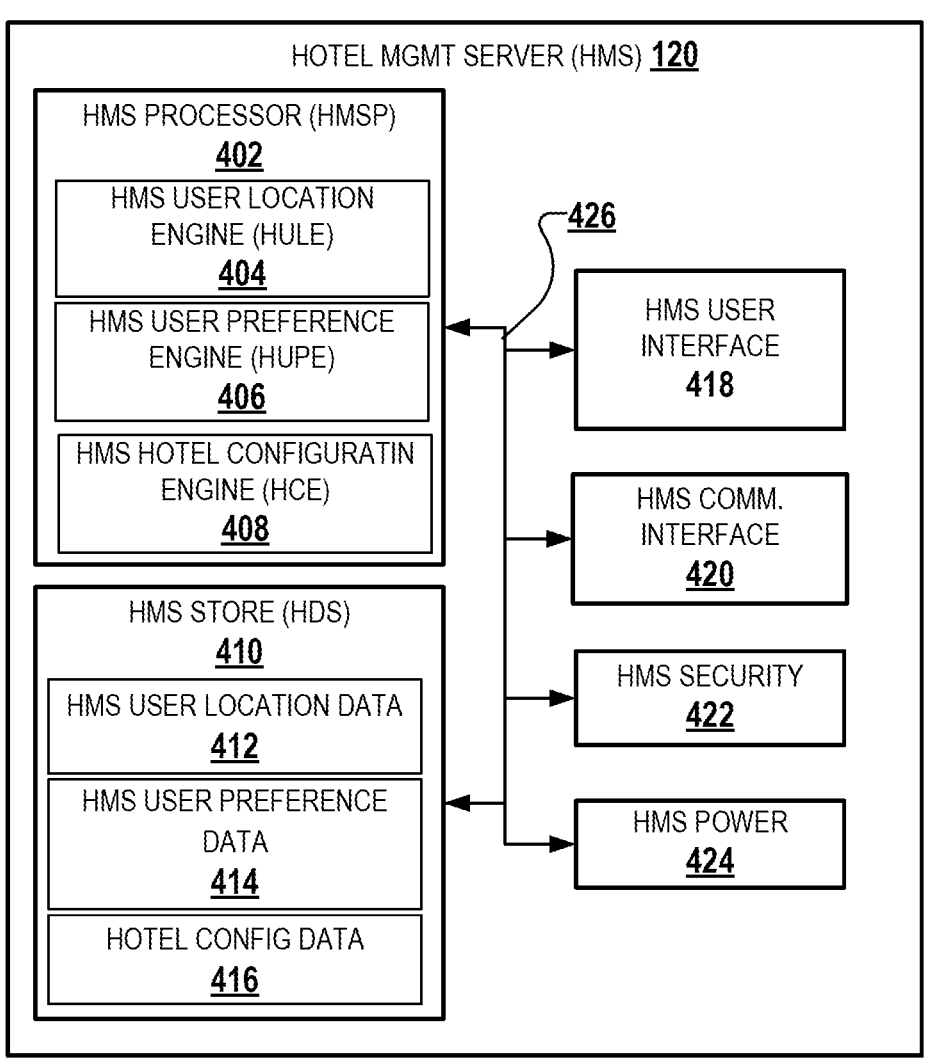
FIG. 4 is a schematic illustration of an HMS configured for use in the UPC of FIG. 1 and in accordance with at least one implementation of the present disclosure.
Figure 7:
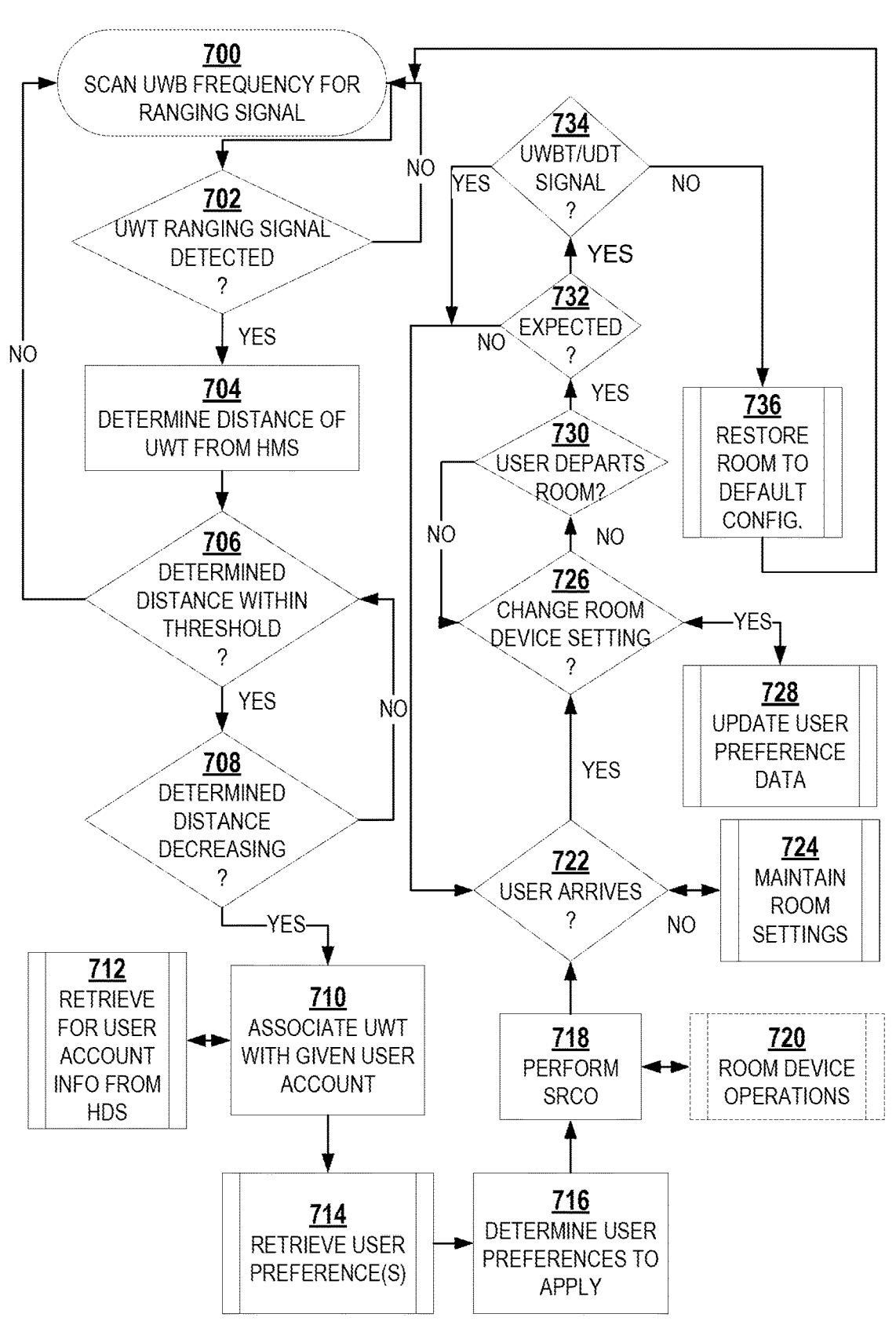
FIG. 7 is a flow chart illustrating operations performed by one or more of an HMS User Location Engine ("HULE"), HMS User Preference Engine ("HUPE") and an HMS Configuration Engine ("HCE") instantiated by an HMS for a UPC and in accordance with at least one implementation of the present disclosure.

As further shown in FIG. 4 and for at least one implementation, the HMS 120 may include an HMS processor ("HMSP") 402. The HMSP 402 may execute sixth computer instructions ("6CIs") which instantiate an HMS User Location Engine ("HULE") 404, seventh computer instructions ("7CIs") which instantiate an HMS User Preference Engine ("HUPE") 406, and eighth computer instructions ("8CIs") which instantiate an HMS Hotel Configuration Engine ("HCE") 408. Operations performed by the HULE 404, HUPE 406 and HCE 408 are shown in FIG. 7 and described below. Other applications, such as guest check-in/check-out applications, hotel facility management, billing, and other applications, web browser applications, and the like may also be executed by the HMSP 402. The HMS 120 may include an HMS data store ("HDS") 410 configured to store, in one or more data sets, HMS user location data 412, HMS user preference data 414, and HMS configuration data 416. Other data set may be stored by the HDS 410. The HMS 120 may also include an HMS user interface 418, an HMS communications interface ("HMSCOM") 420, an HMS security module 422, and an HMS power module 424. An HMD bus 426 couples the HMS 120 components.

HULE 404, HUPE 406, and HCE 408

The HMSP 402 may be configured to execute the 5CIs which instantiate the HULE 404, the 6CIs which instantiate the HUPE 406, and the 7CIs which instantiate the HCE 408. One or more of the 5CIs, 6CIs and 7CIs may be stored in the HDS 410, provided on the Cloud, or otherwise accessible by the HMSP 402.

As shown in FIG. 7 and in accordance with at least one implementation of the present disclosure, operations of other HULE 404, HUPE 406 and HCE 408 are depicted. The HULE 404 performs one or more HMS User Location Operations ("HULOs"), as depicted by Operations 700-708, and thereby detects a presence and a range of a given UPT 104 and/or UVT 114 associated with a given UD 110 from the HMS 120 and/or a given STB 102. The HUPE 406 performs one or more HMS User Preference Operations ("HUPOs"), as depicted by Operations 710-716, and thereby determines one or more user preferences associated with a given STB 102. The HCE 408 performs one or more Hotel Configuration Operations ("HCOs"), as depicted by Operations 718-736, and thereby configures one or more hotel areas, such as a hotel room, for use by a given user, as represented by a given UPT 104 and/or UVT 114 associated with the given user. The HCOs also reconfigures one or more hotel areas upon check-out and/or departure of a given user from the given hotel room, hotel environs, or otherwise.

As per Operations 700-702 and for at least one implementation of the present disclosure, the HULO may include the HMSP 402 instructing the HMSCOM 420 to scan one or more UWB frequencies for a UWB ranging signal emitted by an UPT 104 and/or an UVT 114. For at least one implementation, the HMS 120 may be configured to scan a specific UWB frequency and/or a range of UWB frequencies that are supported by the UPT 104 and the UVT 114. When a UWB ranging signal is detected, the emitting device is designated as a detected UWT, and the operations continue with Operation 704.

As per Operation 704 and for at least one implementation, the HULOs may include the HMSP 402 determining the distance (herein the "HMS determined distance") of the detected UWT from the HMS 120. It is to be appreciated that for at least one implementation, the distance of the detected UWT may be a specified distance from the HMS 120, where the specified distance is not specified in terms of one or more orientations of the HMS 120 to the detected UWT. For another implementation, the HMSCOM 420 may be configured to determine an orientation (herein, the "HMS determined orientation") of a received ranging signal by use of one or more directional antennas, signal processors, or the like. For example, the HMSCOM 420 may be configured to include antenna and/or other receiving devices that are configured to receive ranging signals within a given arc such as within a ninety-degree (90°) of a given orientation, within an omni-direction, e.g., three-hundred and sixty degrees (360°), or otherwise.

As per Operation 706 and for at least one implementation, the HULOs may include the HMSP 402 determining whether the determined distance is within a threshold range. For at least one implementation, the threshold range may be used to determine whether the HMSP 402 is to execute the 7CIs and 8CIs. If the determined distance is not within the threshold range, the operations continue with Operation 700. If the determine distance is within the threshold range, the operation continue with Operation 708.

As per Operation 708 and for at least one implementation, the HULOs may include the HMSP 402 determining whether the determined distance is decreasing over time. The HULE 404 may be configured to determine that the determined distance decreases over time, a given user associated with the detected UWT may be proceeding toward the given hotel where the HMS 120 is located. When "NO," the determined distance is not decreasing over time and the operations continue with Operation 706. When "YES," the determined distance is decreasing over time and the HMSP 402 executes the 7CIs and thereby instantiates the HUPE 406 and performs the HUPOs, as shown by Operations 710-716.

As per Operation 710 and for at least one implementation, the HUPOs may include the HMSP 402 associating the detected UWT with a given user account. To so associate and for at least one implementation, the HMSP 402 may retrieve from the HDS 410 one or more user account identifiers, as shown by Operation 712. The user account identifiers may be provided by the UD 110 to the HMS 120 at a time of registration, in association with a user account, e.g., a frequent visitor account, at a time of user check-in, or otherwise. The user account identifiers may include a UWB number associated with the detected UWT. For at least one implementation, a UWB number may be common for two or more uses of the detected UWT. For another implementation, a UWB number may be transaction specific, e.g., a specific UWB number may be generated for a given booking of a given user, as represented by given UWT associated therewith and/or possessed by the given user. When using a transaction specific UWB number some privacy and/or anonymity for the given user may be provided.

As per Operation 714 and for at least one implementation, the HUPOs may include retrieving from one or more data sets containing HMS user preference data 414, as stored by the HDS 410, wherein the HMS user preference data 414 identifies one or more user preferences for the user account information retrieved by the HMS 120 per Operation 712.

As per Operation 716 and for at least one implementation, the HUPOs may include determining which, if any, of the user preferences to apply to one or more hotel rooms and/or areas that the HMS 120 will associate with the given UD 110 (which is associated with a given user). Such user preferences herein being the "applicable user preferences." It is to be appreciated that an applicable user preference may correspond to one or more times of day, day of week, calendar day, or the like. For example, a user preference for a given hotel room blinds configuration (e.g., open, closed, half-open, etc.) may vary for a given user based on whether it is day or night, whether the sun is then brightly shining on the window or not, and the like.

As per Operations 718 and for at least one implementation, based on the applicable user preferences, the HMSP 402 may execute the 8CIs and instantiate the HCE 408. The HCE 408 performs one or more HCOs and thereby instructs one or more devices into one or more configurations and thereby configures one or more hotel rooms and/or other hotel areas in accordance with the applicable user preferences.

As per Operation 720 and for at least one implementation, one or more devices in the given hotel room may be configured directly by the HMSP 402 and/or indirectly via an STB 102 in the given hotel room. For example, instructions may be directly provided by the HMSP 402 to a given device and/or to an STB 102 in a given hotel room or area such that a television device may be powered on, tuned to a given channel or stream, and have its output sound volume adjusted. For another example, an air conditioning device may be configured into a heating, cooling, recirculating, panning, or other operational state. A temperature setting in a thermostat may be raised or lowered. A window covering may be opened, closed, or the like. It is to be appreciated that the HMSCOM 420 may include one or radio frequency ("RF") modules, such as a Wi-Fi™, Bluetooth™, Ethernet, Zigbee™ or other forms of device control module(s) by which one or more devices within a given hotel room associated, at a given time with a given user, may be configured into one or more states.

As per Operations 722-724 and for at least one implementation, the HCOs may include awaiting the user's arrival at the hotel and maintaining one or more hotel room and/or other hotel area settings until user arrival occurs.

As per Operations 726-728 and for at least one implementation, the process may include determining whether the user changes one or more room device settings. And, if so, updating one or more user preference data stored in the HDS 410 and/or other data stores, such as the STBDS 208 and/or the UDDS 308. For example, a user may adjust a temperature a given time after entering the hotel room and/or after a period of time in the hotel room.

As per Operations 730-732 and for at least one implementation, the HCOs may include determining if the user has departed a given hotel room and/or hotel area and, if so, whether the user's departure is expected. It is to be appreciated that a user's departure may be expected based upon one or more calendar events associated with the user. For example, a user attending a conference may be expected to depart the hotel room to attend an opening or keynote presentation for the conference, as maintained on a hotel wide conference calendar that is accessible to the HMSP 402 and maintained by the HDS 410.

As per Operations 734-736 and for at least one implementation, the HCOs may include determining whether another ranging signal from the detected UWT is present within a given proximity of a given hotel area such as a hotel room assigned to the given user. If "YES", one or more of the hotel room configuration settings may remain unchanged and the process may continue at Operation 722. If "NO," the process may proceed to Operation 736 and one or more of the hotel room and/or other hotel area configuration settings may be restored to a default configuration setting. The process may then continue with Operation 700.

It is to be appreciated that the Operations depicted in FIGS. 5-7 may occur in sequence as shown, and/or in any other sequence of operations including one more operations occurring in parallel.

Although various implementations have been described above with a degree of particularity, or with reference to one or more individual implementations, those skilled in the art could make alterations to the disclosed implementations without departing from the spirit or scope of the present disclosure. The use of the terms "approximately" or "substantially" means that a value of an element has a parameter that is expected to be close to a stated value or position. As is well known in the art, there may be minor variations that prevent the values from being as stated. Accordingly, anticipated variances, such as 10% differences, are reasonable variances that a person having ordinary skill in the art would expect and know are acceptable relative to a stated or ideal goal for one or more implementations of the present disclosure. It is also to be appreciated that the terms "top" and "bottom," "left" and "right," "up" or "down," "first," "second," "next," "last," "before," "after," and other similar terms are used for description and ease of reference purposes and are not intended to be limiting to any orientation or configuration of any elements or sequences of operations for the various implementations of the present disclosure. Further, the terms "coupled," "connected" or otherwise are not intended to limit such interactions and communication of signals between two or more devices, systems, components or otherwise to direct interactions; indirect couplings and connections may also occur. Further, the terms "and" and "or" are not intended to be used in a limiting or expansive nature and cover any possible range of combinations of elements and operations of an implementation of the present disclosure. Other implementations are therefore contemplated. It is intended that matter contained in the above description and shown in the accompanying drawings be interpreted as illustrative of implementations and not limiting. Changes in detail or structure may be made without departing from the basic elements of the present disclosure as described in the following claims.

What is claimed is:

1. A system comprising:
a set top box (STB) associated with a given room;
a local area network (LAN) coupled to the STB;
a hotel management server (HMS) coupled to the STB via the LAN;
a user device (UD), configured for use by a given user;
an ultra-wideband tag (UWT); and
an electronic device coupled to the STB and located within the given room;
wherein the STB comprises:
an STB processor (STBP); and
a non-transient STB data store (STBDS), coupled to the STBP, non-transiently storing:
first computer instructions (1CIs) which, when executed by the STBP, instantiate an STB user location engine (SULE);
second computer instructions (2CIs) which, when executed by the STBP, instantiate an STB user preference engine (SUPE); and
third computer instructions (3CIs) which, when executed by the STBP, instantiate an STB Room Configure Engine (SRCE);
wherein the SULE configures the STB to perform STB User Location Operations (SULOs) comprising:

scanning at least one ultra-wideband (UWB) frequency for a ranging signal transmitted by the UWT; and
when the ranging signal is detected,
determining whether the UWT is within an STB determined distance;
when the UWT is within the STB determined distance:
receiving an association of at least one user preference with the UWT;
determining whether the STB determined distance is within a threshold range;
when the STB determined distance is within the threshold range,
determining whether the STB determined distance is decreasing over time; and
when the STB determined distance is not within the threshold range,
continuing scanning of the at least one UWB frequency for another ranging signal from the UWT or another UWT; and
configuring the electronic device in view of the at least one user preference.

2. The system of claim 1,
wherein the determining of whether the STB determined distance is decreasing over time further comprises:
detecting, at a second time, a second ranging signal from the UWT;
determining, based on the second ranging signal, a second STB determined distance of the UWT from the STB at the second time;
determining, based on the STB determined distance and the second STB determined distance, whether the UWT is approaching the STB; and
when affirmative, executing the 2CIs.

3. The system of claim 2,
wherein the SUPE configures the STB to perform STB User Preference Operations (SUPOs) comprising:
associating the UWT with a given user account.

4. The system of claim 3,
wherein the associating of the UWT with the given user account further comprises:
receiving from the HMS an account identifier associated with the UWT;
retrieving, from a data store accessible to the STB, the at least one user preference associated with the account identifier; and
determining whether to configure the electronic device in the given room based on the at least one user preference.

5. The system of claim 4,
wherein the electronic device is configured using MATTER commands generated by the UD.

6. The system of claim 4,
wherein the electronic device is a window covering;
wherein the at least one user preference indicates that the window covering is to be configured into a first, closed state when the given user arrives at a first time of day; and
wherein the at least one user preference indicates that the window covering is to be configured into a second, open state when the given user arrives at a second time of day.

7. The system of claim 1,
wherein the associating of the UWT with the given user account further comprises:

receiving from the HMS an account identifier associated with the UWT;

retrieving, from a data store accessible to the STB, the at least one user preference associated with the account identifier; and determining whether to apply the at least one user preference when configuring the electronic device in the given room for use by the given user.

8. The system of claim 7, wherein the electronic device is a window covering;

wherein the at least one user preference indicates that the window covering is to be configured into a first, closed state when the given user arrives at a first time of day; and wherein the at least one user preference indicates that the window covering is to be configured into a second, open state when the given user arrives at a second time of day.

9. The system of claim 1, wherein the SRCE configures the STB to perform STB Room Configure Operations (SRCOs) comprising:

generating at least one command to configure the electronic device in view of the at least one user preference.

10. The system of claim 9, wherein the at least one command configures the electronic device prior to the user arriving at the room.

11. The system of claim 9, wherein the at least one command is MATTER protocol compliant.

12. A system comprising:

a set top box (STB) associated with a given room;

a local area network (LAN) coupled to the STB;

a hotel management server (HMS) coupled to the STB via the LAN;

a user device (UD), configured for use by a given user;

an ultra-wideband tag (UWT);

wherein the UWT further comprises a virtual ultra-wideband tag integrated into the UD; and an electronic device coupled to the STB and located within the given room;

wherein the STB comprises:

an STB processor (STBP); and a non-transient STB data store (STBDS), coupled to the STBP, non-transiently storing:

first computer instructions (1CIs) which, when executed by the STBP, instantiate an STB user location engine (SULE);

second computer instructions (2CIs) which, when executed by the STBP, instantiate an STB user preference engine (SUPE); and third computer instructions (3CIs) which, when executed by the STBP, instantiate an STB Room Configure Engine (SRCE);

wherein the SULE configures the STB to perform STB User Location Operations (SULOs) comprising:

scanning at least one ultra-wideband (UWB) frequency for a ranging signal transmitted by the UWT; and when the ranging signal is detected, determining whether the UWT is within an STB determined distance;

when the UWT is within the STB determined distance:

receiving an association of at least one user preference with the UWT; and

24 configuring the electronic device in view of the at least one user preference.

13. A method comprising:

scanning, by a set top box (STB), at least one ultra-wideband (UWB) frequency for a ranging signal transmitted by an ultra-wideband tag (UWT);

wherein the UWT is a virtual ultra-wideband tag provided by a user device;

when the ranging signal is detected, determining whether the UWT is within a determined distance of the STB;

when the UWT is within the determined distance:

receiving at least one user preference for a given user associated with the UWT; and configuring an electronic device, in a given room provided by a hotel operator, coupled to the STB in view of the at least one user preference by sending a MATTER command from the STB to the electronic device.

14. The method of claim 13, wherein the UWT is a physical ultra-wideband tag provided by the hotel operator to the given user.

15. The method of claim 14, wherein the receiving of the at least one user preference further comprises:

associating the UWT with a given user account;

receiving from a hotel management system for the hotel operator an account identifier associated with the UWT;

retrieving, from a data store accessible to the STB, the at least one user preference associated with the account identifier; and wherein the method further comprises:

determining whether to configure the electronic device in the given room based on the at least one user preference.

16. A non-transitory computer readable medium containing first computer instructions (1CIs), second computer instructions (2CIs), and third computer instructions (3CIs), wherein, when executed by a processor in a set top box (STB) in a hotel room provided by a hotel operator, the 1CIs instantiate an STB user location engine (SULE) that configures to perform STB user location operations (SULOs), the 2CIs instantiate an STB user preference engine (SUPE) that configures the STB to perform STB user preference operations (SUPOs), and the 3CIs instantiate an STB room configure engine (SRCE) that configures the STB to perform STB room configure operations (SRCOs), and wherein the SULOs comprise: scanning at least one ultra-wideband (UWB) frequency for a ranging signal transmitted by an ultra-wideband tag (UWT); wherein the UWT is a virtual ultra-wideband tag provided by a user device associated with the given user; and when the ranging signal is detected, determining whether the UWT is within an STB determined distance; and when the UWT is within the STB determined distance, instantiating the SUPE; wherein the SUPOs comprise: associating the UWT with a given user account maintained by a hotel management server (HMS) for the hotel operator; receiving from the HMS an account identifier associated with the UWT; retrieving, from a data store accessible to the STB, at least one user preference associated with the account identifier; and determining whether to configure an electronic device in the given room based on the at least one user preference; and when affirmative, instantiating the SRCE; and wherein the SRCOs comprise: generating, by the STB, at least one command that configures the electronic device in view of the at least one user preference; wherein the at least one command is a MATTER protocol compliant command.

* * * * *